US006763653B2

(12) United States Patent
Orlando et al.

(10) Patent No.: US 6,763,653 B2
(45) Date of Patent: Jul. 20, 2004

(54) COUNTER ROTATING FAN AIRCRAFT GAS TURBINE ENGINE WITH AFT BOOSTER

(75) Inventors: Robert Joseph Orlando, West Chester, OH (US); Thomas Ory Moniz, Loveland, OH (US)

(73) Assignee: General Electric Company, Schenectady, NY (US)

( * ) Notice: Subject to any disclaimer, the term of this patent is extended or adjusted under 35 U.S.C. 154(b) by 66 days.

(21) Appl. No.: 10/253,156

(22) Filed: Sep. 24, 2002

(65) Prior Publication Data

US 2004/0055275 A1 Mar. 25, 2004

(51) Int. Cl.[7] .................................................. F02K 3/02
(52) U.S. Cl. ........................................ 60/226.1; 60/263
(58) Field of Search ........................... 60/226.1, 39.162, 60/268; 416/123, 128, 124, 126, 148 R, 203; 415/199.5

(56) References Cited

U.S. PATENT DOCUMENTS

| | | |
|---|---|---|
| 3,224,194 A | 12/1965 | DeFeo et al. |
| 3,588,269 A | 6/1971 | Wall, Jr. |
| 4,010,608 A | 3/1977 | Simmons |
| 4,064,692 A | 12/1977 | Johnson et al. |
| 4,314,791 A | 2/1982 | Weiler |
| 4,860,537 A | 8/1989 | Taylor |
| 4,965,994 A | 10/1990 | Ciokajlo et al. |
| 4,969,325 A | 11/1990 | Adamson et al. |
| 4,976,102 A | 12/1990 | Taylor |
| 5,010,729 A | 4/1991 | Adamson et al. |
| 5,274,999 A * | 1/1994 | Rohra et al. ............... 60/226.1 |
| 5,307,622 A | 5/1994 | Ciokajlo et al. |
| 5,361,580 A | 11/1994 | Ciokajlo et al. |
| 5,404,713 A | 4/1995 | Johnson |
| 5,443,590 A | 8/1995 | Ciokajlo et al. |
| 5,809,772 A * | 9/1998 | Giffin et al. ............... 60/226.1 |
| 6,339,927 B1 | 1/2002 | DiPietro, Jr. |
| 6,393,831 B1 | 5/2002 | Chamis et al. |
| 6,619,030 B1 * | 9/2003 | Seda et al. .................. 60/226.1 |
| 6,666,017 B2 * | 12/2003 | Prentice et al. ............ 60/226.1 |
| 2003/0163983 A1 * | 9/2003 | Seda et al. .................. 60/226.1 |
| 2003/0200741 A1 * | 10/2003 | Moniz et al. ............... 60/226.1 |

* cited by examiner

Primary Examiner—Justine R. Yu
Assistant Examiner—William H. Rodriguez
(74) Attorney, Agent, or Firm—William Scott Andes; Steven J. Rosen

(57) ABSTRACT

A gas turbine engine turbine assembly includes a high pressure spool having a high pressure turbine drivingly connected to a high pressure compressor by a high pressure shaft which is rotatable about an engine centerline. A low pressure turbine has counter rotatable low pressure inner and outer shaft turbines drivingly connected to coaxial low pressure inner and outer shafts respectively which are at least in part rotatably disposed co-axial with and radially inwardly of the high pressure spool. The low pressure inner shaft turbine is drivingly connected to a forward fan blade row by the low pressure inner shaft. The low pressure outer shaft turbine is drivingly connected to a aft fan blade row by the low pressure outer shaft. A single direction of rotation booster is drivenly connected to the low pressure outer shaft and axially located aft and downstream of the aft fan blade row.

31 Claims, 5 Drawing Sheets

COUNTER ROTATING FAN AIRCRAFT GAS TURBINE ENGINE WITH AFT BOOSTER

BACKGROUND OF THE INVENTION

1. Field of the Invention

The invention relates to counter rotating aircraft gas turbine engines with counter rotating fans driven by counter rotating low pressure turbine rotors and, particularly, for such engines having a booster downstream of the counter rotating fans.

2. Description of Related Art

A gas turbine engine of the turbofan type generally includes a forward fan and booster, a middle core engine, and an aft low pressure power turbine. The core engine includes a high pressure compressor, a combustor and a high pressure turbine in a serial flow relationship. The high pressure compressor and high pressure turbine of the core engine are interconnected by a high pressure shaft. The high pressure compressor, turbine, and shaft essentially form the high pressure rotor. The high pressure compressor is rotatably driven to compress air entering the core engine to a relatively high pressure. This high pressure air is then mixed with fuel in the combustor and ignited to form a high energy gas stream. The gas stream flows aft and passes through the high pressure turbine, rotatably driving it and the high pressure shaft which, in turn, rotatably drives the compressor.

The gas stream leaving the high pressure turbine is expanded through a second or low pressure turbine. The low pressure turbine rotatably drives the fan and booster via a low pressure shaft, all of which form the low pressure rotor. The low pressure shaft extends through the high pressure rotor. Some low pressure turbines have been designed with counter rotating turbines that power counter rotating fans and counter rotating boosters or low pressure compressors. U.S. Pat. Nos. 4,860,537, 5,307,622, and 4,790,133 disclose counter rotating turbines with counter rotating rotors that power counter rotating fans and boosters. Most of the thrust produced is generated by the fan. Blade rows or stages of one of the counter rotating turbines, turbine rotor are interdigitated with blade rows or stages of another of the counter rotating turbine rotors. No vanes are disposed between the interdigitated rows of blades. A radially outer drum supports blade rows of one of the counter rotating turbines. These blade rows depend radially inwardly from the drum.

Advanced commercial gas turbine engines having counter rotating forward and aft fans and counter rotating boosters are being designed. It is desirable to design a counter rotating engine with a peak performance. It has been found that a peak performance can be attained when the forward fan operates at a higher fan pressure ratio and higher rotational speed than the aft fan. This can result in a substantial mis-match in horsepower and rotational speed between the counter rotating rotors. The counter rotating low pressure turbine is required to supply the necessary power to each of the forward and aft fans at the rotational speed of each fan. A conventional counter rotating turbine will operate at peak efficiency when the power split between both shafts is equal and when the rotational speeds are equal and opposite. In such a case, speed and horsepower ratios of the two rotors and turbines are substantially 1. It is highly desirable to have a gas turbine engine with counter rotating low pressure turbines that have different speed and horsepower ratios such as speed ratio of about 1.20 and a horsepower ratio below 1.1 to attain good fan efficiency.

SUMMARY OF THE INVENTION

A gas turbine engine turbine assembly includes a high pressure spool having a high pressure turbine drivingly connected to a high pressure compressor by a high pressure shaft which is rotatable about an engine centerline. A low pressure turbine includes a low pressure turbine flowpath and is located aft of the high pressure spool. The low pressure turbine has counter rotatable low pressure inner and outer shaft turbines drivingly connected to coaxial low pressure inner and outer shafts respectively which are at least in part rotatably disposed co-axial with and radially inwardly of the high pressure spool. The low pressure inner shaft turbine including first low pressure turbine blade rows disposed across the low pressure turbine flowpath and is drivingly connected to a forward fan blade row by the low pressure inner shaft. The low pressure outer shaft turbine including second low pressure turbine blade rows disposed across the low pressure turbine flowpath and is drivingly connected to a aft fan blade row by the low pressure outer shaft. A single direction of rotation booster is drivenly connected to the low pressure outer shaft and axially located aft and downstream of the aft fan blade row. The booster has at least a rotatable first row of booster blades. The single direction of rotation booster as opposed to counter rotational boosters allow the counter rotating low pressure turbines to operate at different speed and horsepower ratios to attain good fan efficiency. One example of such ratios are a speed ratio of about 1.20 and a horsepower ratio below 1.1.

The counter rotatable low pressure inner and outer shaft turbines may be interdigitated such that the first low pressure turbine blade rows interdigitated with the low pressure second turbine blade rows. Alternatively, the low pressure inner and outer shaft turbines may be tandem non-interdigitated aft and forward low pressure turbines, respectively, in which the aft low pressure turbine is located aft and downstream of the forward low pressure turbine. The first low pressure turbine blade rows of the aft low pressure turbines have one row of low pressure stator vanes axially disposed between each pair of the second low pressure turbine blade rows and the second low pressure turbine blade rows of the forward low pressure turbines having one row of the stator vanes axially disposed between each pair of the first low pressure turbine blade rows and disposed across the low pressure turbine flowpath.

One exemplary embodiment of the assembly includes a core engine inlet leading to the high pressure compressor and the booster is operably disposed entirely within the core engine inlet to direct substantially all booster air from the booster into the high pressure compressor. Forward and aft rows of booster vanes may be axially disposed forwardly and aftwardly respectively of the first row of booster blades. The first and a second (or more) rows of booster blades of the booster may be axially disposed between forward and aft booster vanes. At least one middle row of booster vanes is axially disposed between each pair of the rows of booster blades.

Another exemplary embodiment of the assembly has the core engine inlet located downstream and axially aft of the booster. The core engine inlet has an inlet duct splitter axially and radially disposed adjacent to and downstream of the booster for splitting booster air from the booster into booster air first and second portions. The inlet duct splitter is positioned for directing the booster air first portion into the core engine inlet and the booster air second portion around the core engine inlet. The booster includes at least one row of booster blades surrounded by a splitter shroud having a leading edge splitter which is operably disposed adjacent to and downstream of the aft fan blade row for splitting fan flow air exiting the aft fan blade row into a fan flow air first portion into the booster and a fan flow air second portion around the booster. Forward and aft rows of booster vanes may be disposed forwardly and aftwardly of the booster blades, respectively. The aft row of booster vanes may have radially inner vane portions disposed within the core engine inlet and radially outer vane portions disposed between the splitter shroud and a core engine inlet shroud which includes the inlet duct splitter.

The single direction of rotation booster drivenly connected to the low pressure outer shaft and axially located aft and downstream of the aft fan blade row allows a gas turbine engine with counter rotating low pressure turbines, fans, and spools to operate with different speed and horsepower ratios in order to attain good fan efficiency. The single direction of rotation booster also eliminates cantilevered interditized booster blades and thus allows a more efficient engine and a more efficient, mechanically less complicated, and robust design of the fan and booster system.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
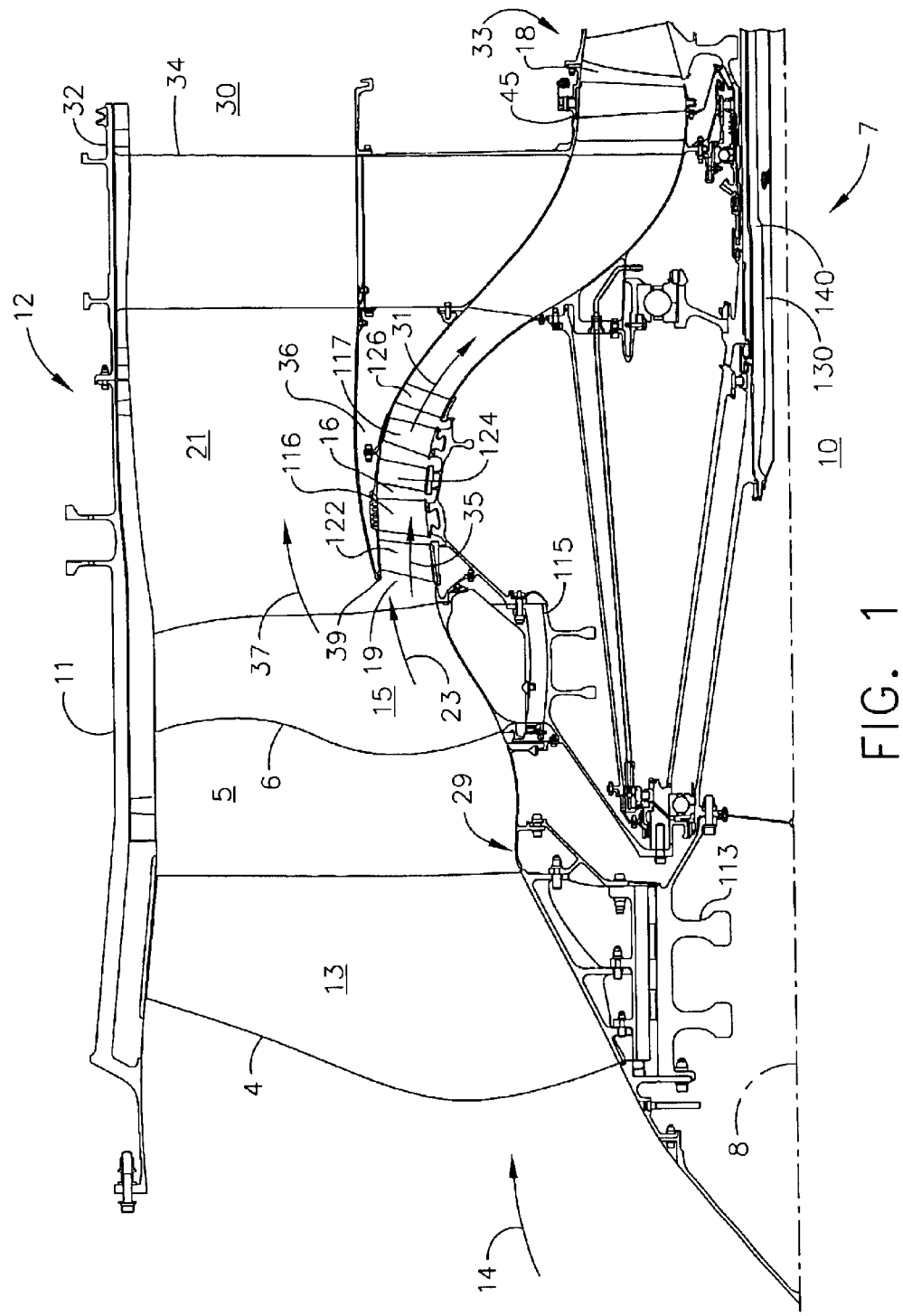
FIG. 1 is a longitudinal sectional view illustration of a forward portion of a first exemplary embodiment of an aircraft turbofan gas turbine engine with a counter rotating low pressure turbine and a single direction of rotation booster located downstream and aft of counter rotating fans.

Illustrated in FIG. 1 is a forward portion 7 of an exemplary turbofan gas turbine engine 10 circumscribed about an engine centerline 8 and having a fan section 12 which receives inlet airflow of ambient air 14. The engine 10 has a frame structure 32 which includes a forward or fan frame 34 connected by engine casing 45 to a turbine center frame 60 and a turbine aft frame 155 illustrated in FIG. 2. The engine 10 is mounted within or to an aircraft such as by a pylon (not illustrated) which extends downwardly from an aircraft wing.

The fan section 12 has counter rotating forward and aft fans 4 and 6, including forward and aft blade rows 13 and 15, mounted on forward and aft fan disks 113 and 115, respectively. A single direction of rotation booster 16 is located aft and downstream of the forward and aft blade rows 13 and 15 and is drivingly connected to the aft fan disk 115 and is thus rotatable with the aft fan 6 and aft blade row 15. The single direction of rotation booster 16 as opposed to counter rotational boosters allow the counter rotating low pressure turbines to operate at different speed and horsepower ratios to attain good fan efficiency. One example of such ratios are a speed ratio of about 1.20 and a horsepower ratio below 1.1. The single direction of rotation booster also eliminates cantilevered interditized booster blades and thus allows a more efficient and robust design of the fan and booster system.

The booster 16 is illustrated in FIG. 1 with first and second rows of booster blades 116 and 117. The first row of booster blades 116 is disposed between forward and middle rows of booster vanes 122 and 124. The second row of booster blades 117 is disposed between the middle row of booster vanes 124 and the aft row of booster vanes 126. The booster 16 is axially located aft of the first and aft fan blade rows 13 and 15. The forward and aft fan blade rows 13 and 15 extend radially outwardly from the forward and aft fan disks 113 and 115, respectively, and extend across a fan duct 5 radially outwardly bounded by a fan casing 11 and radially inwardly bounded by an annular radially inner duct wall 29. The first and second rows of booster blades 116 and 117 are radially disposed within a core engine inlet 19 surrounded by a core engine inlet shroud 36 having an inlet duct splitter 39.

Figure 2:
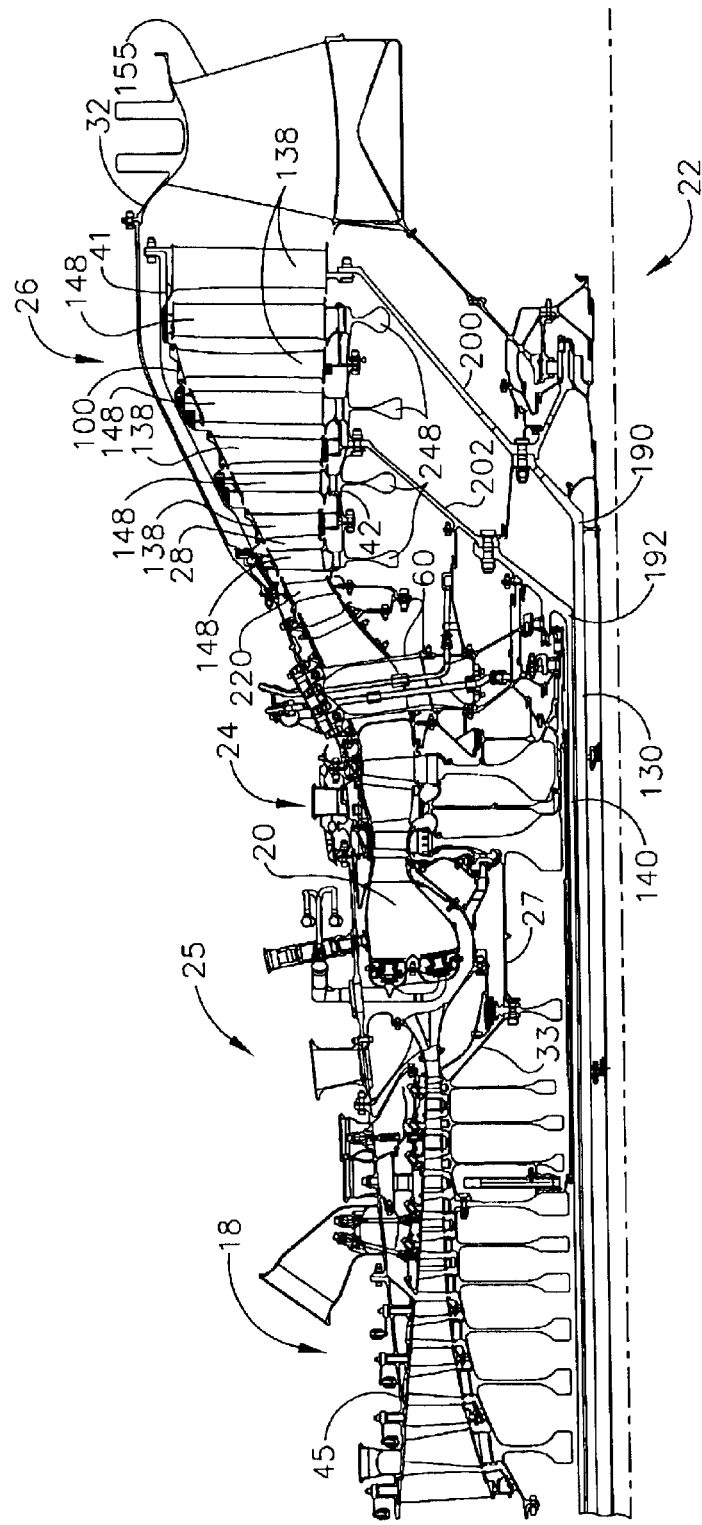
FIG. 2 is a longitudinal sectional view illustration of a first exemplary embodiment of an aft engine portion for use with either of the engines in FIGS. 1 and 5.

Downstream and axially aft of the fan section 12 is a high pressure compressor (HPC) 18 which is further illustrated in FIG. 2. FIG. 2 schematically illustrates an aft portion 22 of the engine 10. Downstream of the HPC 18 is a combustor 20 which mixes fuel with the air 14 pressurized by the HPC 18 for generating combustion gases which flow downstream through a high pressure turbine (HPT) 24, and a counter rotating low pressure turbine (LPT) 26 from which the combustion gases are discharged from the engine 10. A high pressure shaft 27 joins the HPT 24 to the HPC 18 to substantially form a first or high pressure spool 33 (also referred to as a high pressure rotor). The high pressure compressor 18, combustor 20, and high pressure turbine 24, collectively, are referred to as a core engine 25 which includes, for the purposes of this patent, the high pressure shaft 27. The core engine 25 may be modular such that as a single unit it can be independently replaced separate from the other parts of the gas turbine.

Referring back to FIG. 1, a bypass duct 21 is radially outwardly bounded by the fan casing 11 and radially inwardly bounded by the core engine inlet shroud 36. The forward and aft fan blade rows 13 and 15 are disposed within the duct 5 upstream of the bypass duct 21. The inlet duct splitter 39 splits fan flow air 23 exiting the aft fan blade row 15 into a fan flow air first portion 35 into the booster 16 and a fan flow air second portion 37 around the booster 16 into the bypass duct 21 where it then exits the fan section 12 through a fan exit 30 providing thrust for the engine. The fan flow air first portion 35 is pressurized by the booster 16 to form booster air 31 and exits the booster into the high pressure compressor 18 of the core engine 25.

Referring now to FIG. 2, the low pressure turbine 26 includes a low pressure turbine flowpath 28. The low pressure turbine 26 includes counter rotatable low pressure inner and outer shaft turbines 41 and 42 having low pressure inner and outer shaft turbine rotors 200 and 202, respectively. The low pressure inner and outer shaft turbine rotors 200 and 202 include low pressure first and second turbine blade rows 138 and 148, respectively, disposed across the low pressure turbine flowpath 28. Counter rotatable low pressure inner and outer spools 190 and 192 include the low pressure inner and outer shaft turbine rotors 200 and 202 drivingly connected to the forward and aft fan blade rows 13 and 15 by low pressure inner and outer shafts 130 and 140, respectively.

The low pressure inner and outer shafts 130 and 140 are at least in part rotatably disposed co-axially with and radially inwardly of the high pressure spool 33. In the exemplary embodiment illustrated in FIG. 2, there are four rows each of the first and second low pressure turbine blade rows 138 and 148. The booster 16 is drivingly connected to the low pressure outer shaft 140 and is part of the low pressure outer spool 192. A turbine nozzle 220 is disposed axially forward, upstream of, and adjacent to the second low pressure turbine blade rows 148.

The low pressure inner and outer shaft turbines 41 and 42 illustrated in FIG. 2 are interdigitated. The first low pressure turbine blade rows 138 are interdigitated with the second low pressure turbine blade rows 148. The low pressure inner and outer shaft turbines 41 and 42 illustrated in FIG. 2 have four second low pressure turbine blade rows 148 and four first low pressure turbine blade rows 138, respectively. Other embodiments may have two or more second low pressure turbine blade rows 148 and two or more first low pressure turbine blade rows 138. All of the second low pressure turbine blade rows 148 are interdigitated with the first low pressure turbine blade rows 138. The first low pressure turbine blade rows 138 are mounted on a low pressure radially outer turbine drum 100. The turbine drum 100 is part of the low pressure inner shaft turbine rotor 200. The low pressure outer shaft turbine rotor 202 is illustrated as having the four second low pressure turbine blade rows 148 mounted on low pressure second turbine disks 248.

Figure 3:
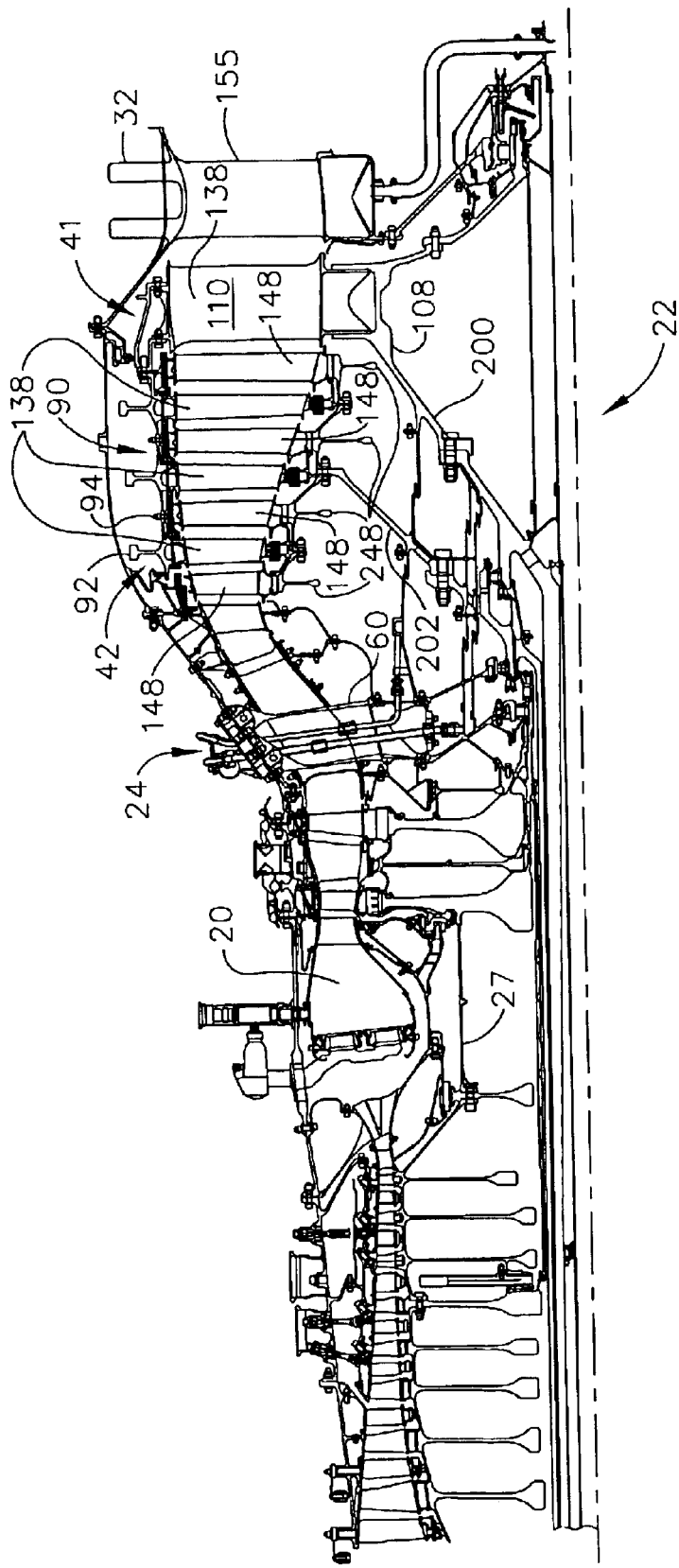
FIG. 3 is a longitudinal sectional view illustration of a second exemplary embodiment of an aft engine portion for use with either of the engines in FIGS. 1 and 5.

Illustrated in FIG. 3 is an alternative construction of the low pressure inner and outer shaft turbines 41 and 42 having an aftmost or fourth row 110 of the first low pressure turbine blade rows 138 which is part of a rotating frame 108 which supports a radially outer turbine ring assembly 90 and is rotatably supported by a center frame 60 and a turbine aft frame 155. The radially outer turbine ring assembly 90 has three separate turbine rotor rings 92 from which the first three first low pressure turbine blade rows 138 are supported respectively. The turbine rotor rings 92 are connected together by bolted connections 94. The low pressure outer shaft turbine rotor 202 is illustrated as having the four second low pressure turbine blade rows 148 mounted on the low pressure second turbine disks 248.

Figure 4:
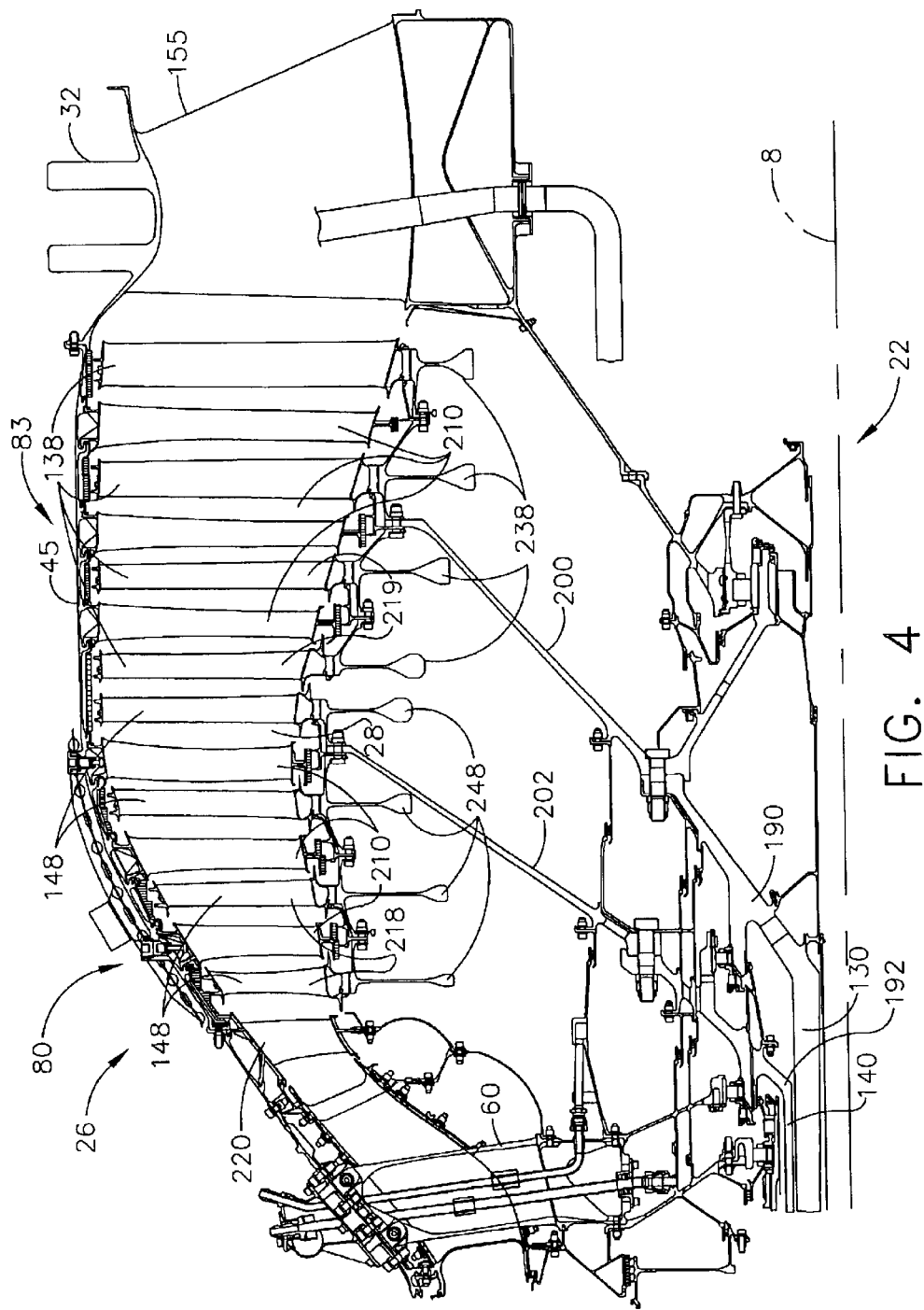
FIG. 4 is a longitudinal sectional view illustration of a third exemplary embodiment of an aft engine portion for use with either of the engines in FIGS. 1 and 5.

Illustrated in FIGS. 4 is an alternative embodiment of the low pressure turbine 26. The engine 10 has a single stage booster 16 with no counter rotating counterpart and tandem non-interdigitated counter rotating low pressure turbines incorporating a row of stator vanes 210 between the first low pressure turbine blade rows 138 and the second low pressure turbine blade rows 148.

The low pressure turbine 26 includes tandem non-interdigitated counter rotating forward and aft low pressure turbines 80 and 83 and a low pressure turbine flowpath 28. The tandem non-interdigitated aft and forward low pressure turbines 83 and 80 are the counter rotatable low pressure inner and outer shaft turbines 41 and 42, respectively. The low pressure inner spool 190 includes the aft low pressure turbine 83 and the low pressure outer spool 192 includes the forward low pressure turbine 80. The aft low pressure turbine 83 includes low pressure first turbine blade rows 138 disposed across the low pressure turbine flowpath 28 and is drivingly connected to the forward fan blade row 13 by the low pressure inner shaft 130.

The forward low pressure turbine 80 includes second low pressure turbine blade rows 148 disposed across the low pressure turbine flowpath 28 and is drivingly connected to a aft fan blade row 15 by the low pressure outer shaft 140. In the exemplary embodiment illustrated herein, there are four rows each of the first and second low pressure turbine blade rows 138 and 148. The booster 16 is drivingly connected to one of the low pressure outer shaft 140.

The first low pressure turbine blade rows 138 are disposed downstream of the second low pressure turbine blade rows 148 along the low pressure turbine flowpath 28. The rows of non-rotatable stator vanes 210 are disposed across the low pressure turbine flowpath 28 between first adjacent pairs 219 of the first low pressure turbine blade rows 138 and between second adjacent pairs 218 of the second low pressure turbine blade rows 148. A turbine nozzle 220 is disposed axially forward, upstream of, and adjacent to the first low pressure turbine blade rows 138.

The tandem non-interdigitated counter rotating forward and aft low pressure turbines 80 and 83 and the row of the stator vanes 210 helps the engine to be operated at or near a peak performance by allowing the forward fan to operate at a higher fan pressure ratio and higher rotational speed than the aft fan while avoiding a substantial mis-match in horsepower and rotational speed between the counter rotating low pressure turbines and rotors. This allows the engine to operate with different speed and horsepower ratios such as speed and horsepower ratios of 1.2 or more to help attain peak fan efficiency. The tandem non-interdigitated counter rotating forward and aft low pressure turbines also are of a light weight design and are easily rotatably supported by the engine's static frames.

The exemplary embodiment has an equal number of the first low pressure turbine blade rows 138 and the second low pressure turbine blade rows 148. More particularly, the exemplary embodiment has four of the first low pressure turbine blade rows 138 and four of the second low pressure turbine blade rows 148. The first low pressure turbine blade rows 138 are illustrated as being mounted on low pressure first turbine disks 238 of the low pressure inner shaft turbine rotor 200 and the second turbine blade rows 148 are illustrated as being mounted on low pressure second turbine disks 248 of low pressure outer shaft rotor 202. Alternatively, the first and second low pressure turbine blade rows 138 and 148 may be mounted on drums of the low pressure inner and outer shaft turbine rotors 200 and 202, respectively. A turbine nozzle 220 is disposed axially forward, upstream of, and adjacent to the first low pressure turbine blade rows 138.

Figure 5:
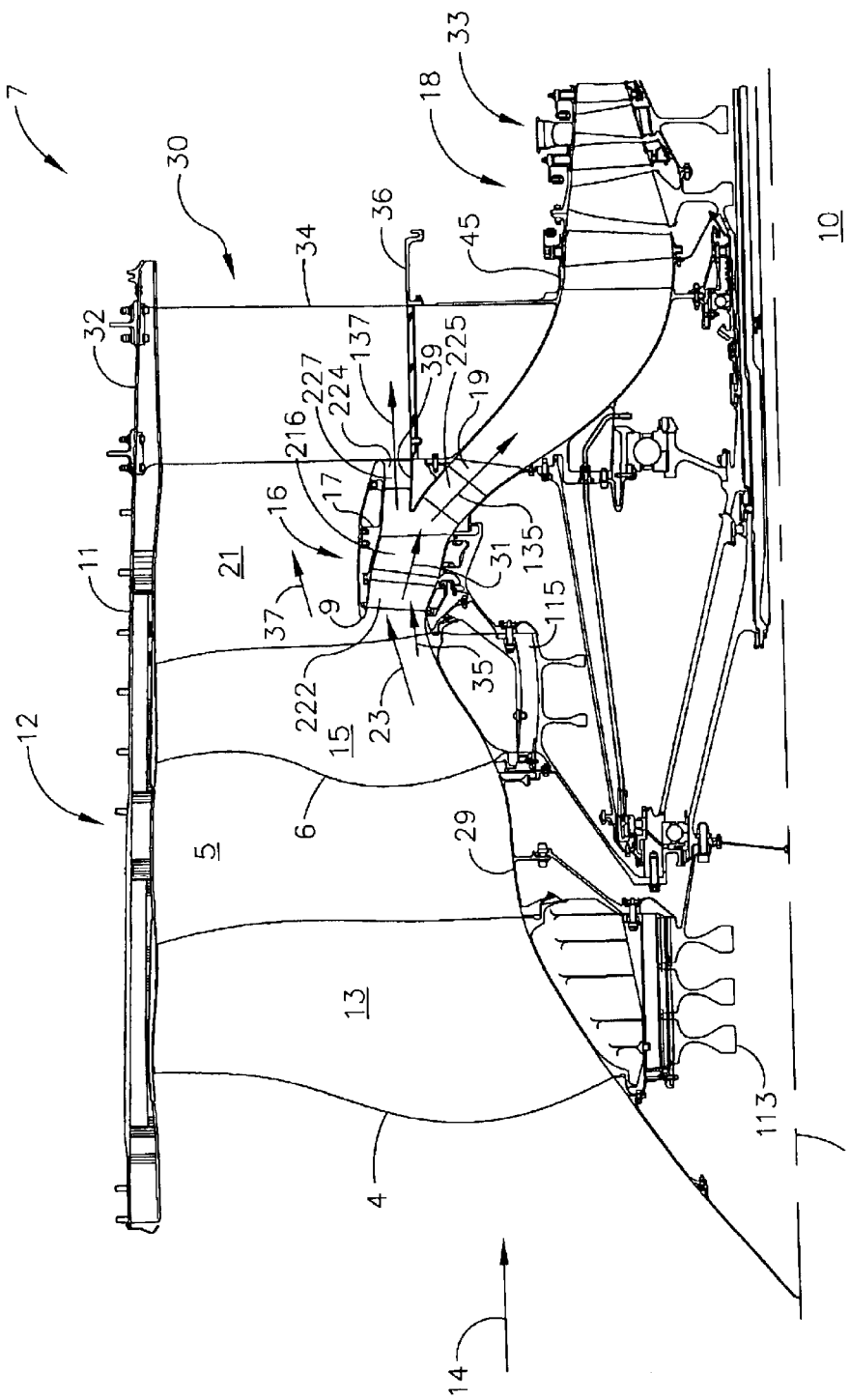
FIG. 5 is a longitudinal sectional view illustration of a forward portion of a second exemplary embodiment of an aircraft turbofan gas turbine engine with a counter rotating low pressure turbine and a single direction of rotation booster located downstream and aft of counter rotating fans.

Illustrated in FIG. 5 is a forward portion 7 of an alternative exemplary turbofan gas turbine engine 10 circumscribed about the engine centerline 8 and including the fan section 12 which receives inlet airflow of ambient air 14. The engine 10 includes the frame structure 32 which includes the forward or fan frame 34 connected by the engine casing 45 to the turbine center frame 60 and the turbine aft frame 155 illustrated in FIGS. 2–4. The fan section 12 has the counter rotating forward and aft fans 4 and 6 including the forward and aft blade rows 13 and 15, mounted on the forward and aft fan disks 113 and 115, respectively.

The single direction of rotation booster 16 is drivingly connected to the aft fan disk and 115 and is thus rotatable with the aft fan 6 and aft blade row 15 and operably connected to and in operation is driven by the low pressure outer shaft 140. The booster 16 is illustrated in FIG. 5 with a single row of booster blades 216. The row of booster blades 216 is disposed between the forward and aft rows of booster vanes 222 and 224. In the exemplary embodiment illustrated in FIG. 5, the aft row of booster vanes 224 has radially inner vane portions 225 disposed between within the core engine inlet 19 and radially outer vane portions 227 disposed between the splitter shroud 17 and the core engine inlet shroud 36. The booster 16 is axially located aft of the first and aft fan blade rows 13 and 15. The forward and aft fan blade rows 13 and 15 extend radially outwardly from the forward and aft fan disks 113 and 115, respectively, and extend across the fan duct 5 radially outwardly bounded by the fan casing 11.

The row of booster blades 216 is surrounded by a splitter shroud 17 having a leading edge splitter 9. The bypass duct 21 is radially outwardly bounded by the fan casing 11 and generally radially inwardly bounded by the splitter shroud 17 and the core engine inlet shroud 36. The splitter shroud 17 and leading edge splitter 9 splits fan flow air 23 exiting the aft fan blade row 15 into a fan flow air first portion 35 into the booster 16 and a fan flow air second portion 37 around the booster 16 into the bypass duct 21 where it then exits the fan section 12 through a fan exit 30 providing thrust for the engine. The fan flow air first portion 35 is pressurized by the booster 16 to form booster air 31 which exits the booster and is split into booster air first and second portions 135 and 137, respectively, by an inlet duct splitter 39. The inlet duct splitter 39 directs the booster air first portion 135 into an core engine inlet 19 leading to the high pressure compressor 18 of the core engine 25. The inlet duct splitter 39 also directs the booster air first portion around the core engine 25 into the bypass duct 21 where it then exits the fan section 12 through the fan exit 30. The booster air second portion 137 flows around the core engine inlet 19 into the bypass duct 21 where it then exits the fan section 12 through the fan exit 30 providing thrust for the engine.

Various configurations of the low pressure turbine may be used. There may be an equal or an unequal number of the first and second low pressure turbine blade rows and there may be three or four or more of each of the first and the second low pressure turbine blade rows.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A gas turbine engine turbine assembly comprising:
   a high pressure spool including a high pressure turbine drivingly connected to a high pressure compressor by a high pressure shaft and rotatable about an engine centerline,
   a low pressure turbine having a low pressure turbine flowpath and located aft of said high pressure spool,
   said low pressure turbine having counter rotatable low pressure inner and outer shaft turbines,
   said low pressure turbine having low pressure inner and outer shafts respectively which are at least in part rotatably disposed co-axial with and radially inwardly of said high pressure spool,
   said low pressure inner shaft turbine including first low pressure turbine blade rows disposed across said low pressure turbine flowpath and drivingly connected to a forward fan blade row by said low pressure inner shaft,
   said low pressure outer shaft turbine including second low pressure turbine blade rows disposed across said low pressure turbine flowpath and drivingly connected to a aft fan blade row by said low pressure outer shaft,
   a single direction of rotation booster drivenly connected to said low pressure outer shaft and axially located aft and downstream of said aft fan blade row, and
   said booster having at least a rotatable first row of booster blades.

2. An assembly as claimed in claim 1 further comprising a core engine inlet to said high pressure compressor and said booster being operably disposed entirely within said core engine inlet to direct substantially all booster air from said booster into said high pressure compressor.

3. An assembly as claimed in claim 2 further comprising forward and aft rows of booster vanes axially disposed forwardly and aftwardly respectively of said first row of booster blades of said booster.

4. An assembly as claimed in claim 2 further comprising a second row of booster blades and forward and aft booster vanes disposed forwardly and aftwardly of said first and second rows of booster blades of said booster respectively and at least one middle row of booster vanes axially disposed between each pair of said rows of booster blades.

5. An assembly as claimed in claim 3 further comprising a turbine nozzle disposed axially forward, upstream of, and adjacent to said second low pressure turbine blade rows.

6. An assembly as claimed in claim 1 further comprising:
   a core engine inlet to said high pressure compressor,
   said core engine inlet having an inlet duct splitter,
   said inlet duct splitter axially and radially disposed adjacent to and downstream of said booster for splitting booster air from said booster into booster air first and second portions, and
   said inlet duct splitter positioned for directing said booster air first portion into said core engine inlet and said booster air second portion around said core engine inlet.

7. An assembly as claimed in claim 6 further comprising at least one row of booster blades surrounded by a splitter shroud having a leading edge splitter, said leading edge splitter operably disposed adjacent to and downstream of said aft fan blade row for splitting fan flow air exiting said aft fan blade row into a fan flow air first portion into said booster and a fan flow air second portion around said booster.

8. An assembly as claimed in claim 7 further comprising forward and aft booster vanes disposed forwardly and aftwardly of said booster blades respectively.

9. An assembly as claimed in claim 8 further comprising said aft row of booster vanes having radially inner vane portions disposed within said core engine inlet and radially outer vane portions disposed between said splitter shroud and a core engine inlet shroud which includes said inlet duct splitter.

10. An assembly as claimed in claim 8 further comprising a turbine nozzle disposed axially forward, upstream of, and adjacent to said second low pressure turbine blade rows.

11. An assembly as claimed in claim 1 further comprising said first low pressure turbine blade rows interdigitated with said low pressure second turbine blade rows.

12. An assembly as claimed in claim 11 further comprising a core engine inlet to said high pressure compressor and said booster being operably disposed entirely within said core engine inlet to direct substantially all booster air from said booster into said high pressure compressor.

13. An assembly as claimed in claim 12 further comprising forward and aft rows of booster vanes axially disposed forwardly and aftwardly respectively of said first row of booster blades of said booster.

14. An assembly as claimed in claim 12 further comprising a second row of booster blades and forward and aft booster vanes disposed forwardly and aftwardly of said first and second rows of booster blades of said booster respectively and at least one middle row of booster vanes axially disposed between each pair of said rows of booster blades.

15. An assembly as claimed in claim 13 further comprising a turbine nozzle disposed axially forward, upstream of, and adjacent to said second low pressure turbine blade rows.

16. An assembly as claimed in claim 11 further comprising:
   a core engine inlet to said high pressure compressor,
   said core engine inlet having an inlet duct splitter,
   said inlet duct splitter axially and radially disposed adjacent to and downstream of said booster for splitting booster air from said booster into booster air first and second portions, and
   said inlet duct splitter positioned for directing said booster air first portion into said core engine inlet and said booster air second portion around said core engine inlet.

17. An assembly as claimed in claim 16 further comprising at least one row of booster blades surrounded by a splitter shroud having a leading edge splitter, said leading edge splitter operably disposed adjacent to and downstream of said aft fan blade row for splitting fan flow air exiting said aft fan blade row into a fan flow air first portion into said booster and a fan flow air second portion around said booster.

18. An assembly as claimed in claim 17 further comprising forward and aft booster vanes disposed forwardly and aftwardly of said booster blades respectively.

19. An assembly as claimed in claim 18 further comprising said aft row of booster vanes having radially inner vane portions disposed within said core engine inlet and radially outer vane portions disposed between said splitter shroud and a core engine inlet shroud which includes said inlet duct splitter.

20. An assembly as claimed in claim 18 further comprising a turbine nozzle disposed axially forward, upstream of, and adjacent to said second low pressure turbine blade rows.

21. An assembly as claimed in claim 1 further comprising:
   said counter rotatable low pressure inner and outer shaft turbines being tandem non-interdigitated aft and forward low pressure turbines respectively,
   said first low pressure turbine blade rows of said aft low pressure turbines having one row of stator vanes axially disposed between each pair of said second low pressure turbine blade rows and disposed across said low pressure turbine flowpath, and
   said second low pressure turbine blade rows of said forward low pressure turbines having one row of said stator vanes axially disposed between each pair of said first low pressure turbine blade rows and disposed across said low pressure turbine flowpath.

22. An assembly as claimed in claim 21 further comprising a turbine nozzle disposed axially forward, upstream of, and adjacent to said second low pressure turbine blade rows.

23. An assembly as claimed in claim 21 further comprising a core engine inlet to said high pressure compressor and said booster being operably disposed entirely within said core engine inlet to direct substantially all booster air from said booster into said high pressure compressor.

24. An assembly as claimed in claim 23 further comprising forward and aft rows of booster vanes axially disposed forwardly and aftwardly respectively of said first row of booster blades of said booster.

25. An assembly as claimed in claim 23 further comprising a second row of booster blades and forward and aft booster vanes disposed forwardly and aftwardly of said first and second rows of booster blades of said booster respectively and at least one middle row of booster vanes axially disposed between each pair of said rows of booster blades.

26. An assembly as claimed in claim 24 further comprising a turbine nozzle disposed axially forward, upstream of, and adjacent to said second low pressure turbine blade rows.

27. An assembly as claimed in claim 22 further comprising:
   a core engine inlet to said high pressure compressor,
   said core engine inlet having an inlet duct splitter,
   said inlet duct splitter axially and radially disposed adjacent to and downstream of said booster for splitting booster air from said booster into booster air first and second portions, and
   said inlet duct splitter positioned for directing said booster air first portion into said core engine inlet and said booster air second portion around said core engine inlet.

28. An assembly as claimed in claim 27 further comprising at least one row of booster blades surrounded by a splitter shroud having a leading edge splitter, said leading edge splitter operably disposed adjacent to and downstream of said aft fan blade row for splitting fan flow air exiting said aft fan blade row into a fan flow air first portion into said booster and a fan flow air second portion around said booster.

29. An assembly as claimed in claim 28 further comprising forward and aft booster vanes disposed forwardly and aftwardly of said booster blades respectively.

30. An assembly as claimed in claim 29 further comprising said aft row of booster vanes having radially inner vane portions disposed within said core engine inlet and radially outer vane portions disposed between said splitter shroud and a core engine inlet shroud which includes said inlet duct splitter.

31. An assembly as claimed in claim 29 further comprising a turbine nozzle disposed axially forward, upstream of, and adjacent to said second low pressure turbine blade rows.

* * * * *